United States Patent Office 3,772,375
Patented Nov. 13, 1973

3,772,375
PROCESS FOR PRODUCING ε-HYDROXYCAPROIC ACID
Jean-Claude Brunie, Michel Costantini, and Noel Crenne, Lyon, and Michel Jouffret, Villeurbanne, France, assignors to Rhone-Poulenc S.A., Paris, France
No Drawing. Filed Oct. 8, 1969, Ser. No. 864,885
Claims priority, application France, Oct. 11, 1968, 169,139
Int. Cl. C07c *51/16, 51/24, 59/04*
U.S. Cl. 260—533 C                          7 Claims

ABSTRACT OF THE DISCLOSURE

ε-Hydroxycaproic acid is made by hydrogenation of 6-hydroperoxyhexanoic acid itself preferably isolated from an aqueous wash of the product of oxidising cyclohexane with molecular oxygen in the liquid phase without a metal catalyst.

---

The present invention relates to a process for producing ε-hydroxycaproic acid.

It is known to oxidise cyclohexane with gaseous mixtures containing molecular oxygen to give solutions in which the nature and proportion of the oxidation products vary considerably depending on the conditions under which the oxidation is carried out.

Thus cyclohexanol and cyclohexanone are principally obtained during the oxidation of cyclohexane by air in the liquid phase and in the presence of metal catalysts such as cobalt derivatives. It is known to remove at least a part of the by-products formed during the oxidation, before distilling the final products, by washing with water or with alkaline solutions either at the end of the oxidation or during or between the various oxidation stages. Alongside diacids such as succinic, glutaric and adipic acids, the aqueous wash solutions thus obtained contain hydroxycaproic acid and polymers derived therefrom which can, according to the known processes, be isolated or converted by extraction or chemical treatment of the solutions.

It is also known that cyclohexane oxidation products in which the proportion of cyclohexyl hydroperoxide in the oxidised products is relatively high can be obtained if certain conditions for carrying out the process are observed. Among these, it has been proposed to carry out the oxidation without a catalyst, to provide the reagents with a very short dwell time in the oxidiser, and to work at relatively low temperatures with low degrees of conversion and in an apparatus which does not catalyse the decomposition of the hydroperoxides. Along these lines it has also been suggested to work in the presence of sequestering agents for metals and to treat the cyclohexane which is recycled to the oxidation zone with a basic reagent.

Despite these various measures, which undoubtedly contribute to increasing the proportion of cyclohexyl hydroperoxide in the oxidation products, a large amount of by-products nevertheless still forms during the oxidation. Among these only cyclohexanol, cyclohexanone and adipic acid have hitherto aroused interest because they are fundamental starting materials for the chemical industry. Now, in view of the increasing importance of the preparation of cyclohexane solutions of cyclohexyl hydroperoxide the utilisation of the by-products which the solutions contain, other than those quoted above, has become very important.

The present invention provides a process for producing ε-hydroxycaproic acid which comprises hydrogenating 6-hydroperoxyhexanoic acid (as such or as a salt) with molecular hydrogen at a temperature of 15 to 130° C. in the presence of a palladium, rhodium or platinum catalyst. The ε-hydroxycaproic acid is obtained by oxidation of cyclohexane in the liquid phase without a metal catalyst, by means of a gas containing molecular oxygen, washing the oxidation solutions containing cyclohexyl hydroperoxide with water, separating the aqueous phase, and then subjecting the 6-hydroperoxyhexanoic acid present in the aqueous wash solutions to the said hydrogenation.

One of the advantages of this process is that it makes possible the recovery of ε-hydrocaproic acid which is a precursor of polyesters and polyamides. Another advantage is that the cyclohexane solutions of cyclohexyl hydroperoxide which have been treated in this way contain less oxidation by-products and are more suitable for certain applications.

Any cyclohexane oxidation product containing cyclohexyl hydroperoxide and prepared without a metal catalyst can be treated by the new process, but the benefit derived from this treatment is the greater the higher is the hydroperoxide content in the oxidised products. The invention is especially advantageous in connection with the treatment of cyclohexane solutions of cyclohexyl hydroperoxide in which the oxidised products which are less volatile than cyclohexane contain at least 50% by weight of peroxide products. Such solutions can be prepared according to the process described in French Pat. No. 1,505,363 as well as according to the first stage of the process described in U.S. Pat. No. 2,931,834. These solutions can be concentrated before being washed, by applying any known technique.

The washing with water is carried out in the liquid phase at 5° to 100° C. preferably 15° to 30° C., optionally under autogenous pressure or under a pressure generated by an inert gas such as nitrogen if the temperature employed is above the boiling point of the water-cyclohexane azeotrope. The weight of water used is generally 0.01 to 1 times, and preferably 0.05 to 0.5 times, the weight of solution to be washed. Any conventional technique for washing in the liquid phase can be used and the process can be carried out continuously or discontinuously.

The aqueous wash solutions obtained can be reduced directly so as to convert the 6-hydroperoxyhexanoic acid into ε-hydrocaproic acid. They can also be concentrated beforehand, preferably under reduced pressure and at a temperature not exceeding 50° C., and the diacids which precipitate then separated, optionally after cooling. It is also possible to extract the small quantities of cyclohexyl hydroperoxide, cyclohexanol and cyclohexanone which these aqueous concentrated or nonconcentrated solutions contain with a liquid hydrocarbon such as cyclohexane.

The 6-hydroperoxyhexanoic acid can if desired be purified before subjecting it to the hydrogenation. This purification can for example consist of an extraction of the aqueous wash solutions with a water-immiscible alcohol, ester or ketone. The alcohols which can be used include alkanols having 4 to 10 carbon atoms, cycloalkanols having 5 to 8 carbon atoms in the ring and optionally substituted by one or more alkyl groups having 1 to 4 carbon atoms, and phenylalkanols having 7 to 10 carbon atoms. As ketones which can be used, dialkyl ketones having 4 to 12 carbon atoms, cycloalkanones having 5 to 8 carbon atoms in the ring and optionally substituted by alkyl groups having 1 to 4 carbon atoms, phenyl alkyl ketones and cycloalkyl alkyl ketones having 8 to 10 carbon atoms may be mentioned. Suitable esters are those derived from alkanecarboxylic acids having 2 to 8 carbon atoms and alkanols having 1 to 4 carbon atoms. Particular examples of extraction agents which meet the criteria enumerated above are ethyl acetate, amyl acetate, butyl propionate, methyl 2-ethylhexanoate, amyl alcohols, 2-ethylhexanol, 3 - methyl - pentanol-2, methylcyclohexanols, methyl ethyl ketone, methyl isobutyl ketone, cyclohexanone and acetophenone. The extraction can be carried out at 10° to 30° C. using weights of extraction agent representing 0.5 to 5 times the weight of the aqueous solution to be extracted.

The organic solutions of 6-hydroperoxyhexanoic acid can also be directly subjected to the hydrogenation operation. It is also possible to concentrate these solutions beforehand and optionally to replace the solvent removed, partly or completely, by another solvent which may be aqueous or organic and which does not result in a side-reaction under the reduction conditions.

The hydrogenation of the 6-hydroxyperoxyhexanoic acid is preferably carried out at 50° to 100° C. under a pressure of the order of 2 to 20 bars. The catalyst may be deposited on a carrier such as silica, alumina, charcoal or an aluminosilicate. When a carrier such as an activated alumina is used, for which a prolonged dwell in an acid medium tends to be harmful, it is advantageous to block the carboxyl group and to subject an aqueous solution of sodium 6-hydroperoxyhexanoate to the catalytic hydrogenation. This salt can be obtained simply by adding sodium carbonate or sodium bicarbonate to an aqueous solution of 6-hydroperoxyhexanoic acid.

When the hydrogenation is carried out in an aqueous medium the ε-hydroxycaproic acid can be separated by extracting the aqueous phase, optionally after addition of acid, with an organic solvent which is immiscible with water, such as one of those described above. The organic solutions thus obtained, as well as those from the hydrogenation in an organic medium, can be freed of their solvent by heating to a temperature which is preferably below 50° C., optionally under reduced pressure.

The examples which follow illustrate the invention.

EXAMPLE 1

(a) 368 g. of water at 25° C. are added to 9370 g. of a cyclohexane solution of hydroperoxides, obtained by oxidising cyclohexane in the liquid phase without a catalyst with air of lowered oxygen content and pre-concentration of the mixture, and the mixture is stirred for about one minute. The aqueous phase is separated from the organic phase and this procedure is repeated twice more. The aqueous solutions thus obtained are combined and washed twice, using 460 cm.³ of cyclohexane each time. The aqueous solution weighing 1227 g. is retained. Measurements carried out on an aliquot portion show that it contains 0.76 mol of 6-hydroperoxyhexanoic acid.

(b) 50 g. of this aqueous solution are introduced into a 250 cm.³ autoclave which is agitated by shaking, followed by 0.265 g. of a catalyst consisting of palladium deposited on vegetable charcoal (palladium content: 10% by weight). Hydrogen is then injected under a pressure of 15 bars at 20° C. and the whole then heated to 80° C. The maximum pressure observed at this temperature is 14.5 bars. After 30 minutes the apparatus is cooled and the gas released. The residual mixture is filtered and then extracted with 150 cm.³ of ethyl acetate. The organic phase is freed of the solvent by heating to 30° C. under a pressure which is progressively reduced to 1 mm. of mercury. Finally 5.3 g. of a product containing 3.2 g. of ε-hydroxycaproic acid remain.

The cyclohexane solution of hydroperoxides employed was prepared by the process described in French Pat. No. 1,491,518, the degree of conversion at the outlet of the last oxidiser being 4.15%. The solution contains 19% by weight of oxidation products and 13.2% of hydroperoxides.

EXAMPLE 2

The procedure of Example 1 is followed but the hydrogenation is carried out at 20° C. for 1 hour. 5.12 g. of a pasty product containing 2.7 g. of ε-hydroxycaproic acid are obtained.

EXAMPLE 3

(a) 294.7 g. of the aqueous solution obtained in Example 1(a) are extracted in five stages, each time using 72 g. of ethyl acetate, and the organic phase is then concentrated at 20° C. under 100 mm. of mercury. 89.6 g. of a solution are left, in which 0.160 mol of 6-hydroperoxyhexanoic acid are found by analysis.

(b) A catalytic hydrogenation is carried out under the conditions described in Example 1(b), starting from 43.3 g. of this solution and 0.32 g. of catalyst and diluting the mixture with 74.7 g. of ethyl acetate. After cooling and degassing, the mixture is filtered, and the solvent is driven off under the conditions described in Example 1(b). 15.8 g. of a product containing 9.5 g. of ε-hydroxycaproic acid are obtained.

We claim:

1. Process for producing ε-hydroxycaproic acid which consists essentially of washing with water a solution of cyclohexyl hydroperoxide in cyclohexane, which has been obtained by oxidation of cyclohexane in the liquid phase without a metal catalyst with a gas containing molecular oxygen, separating the aqueous phase and subjecting the 6-hydroperoxyhexanoic acid as such or as a salt contained in the aqueous phase to hydrogenation with molecular hydrogen at a temperature of 15–130° C. in the presence of a catalyst consisting essentially of metallic palladium, rhodium or platinum.

2. Process according to claim 1 in which the aqueous wash solution is directly hydrogenated.

3. Process according to claim 1 in which the aqueous wash solution is extracted beforehand with a liquid hydrocarbon.

4. Process according to claim 1 in which the 6-hydroperoxyhexanoic acid is extracted from the aqueous wash solution with a water-immiscible alcohol, ester or ketone.

5. Process according to claim 1 in which the hydrogenation is effected at 50° to 100° C. under a hydrogen pressure of 2 to 20 bars.

6. Process according to claim 1 in which the catalyst is metallic palladium.

7. Process according to claim 1 in which the hydrogenation is carried out at 50 to 100° C. under a hydrogen pressure of 2 to 20 bars in the presence of a metallic palladium catalyst.

References Cited

UNITED STATES PATENTS

| 3,299,127 | 6/1967 | Zienty | 260—535 |
|---|---|---|---|
| 2,782,219 | 2/1957 | Cleaver | 260—535 X |
| 2,884,451 | 4/1959 | Graham | 260—540 |
| 3,278,608 | 10/1966 | Clement | 260—632 R X |
| 3,524,892 | 8/1970 | Horlenko et al. | 260—638 A X |
| 3,558,687 | 1/1971 | Russell | 260—632 X |
| 2,931,834 | 9/1965 | Crouch et al. | 260—586 B |
| 3,277,168 | 10/1968 | Koenig | 260—586 B X |
| 3,515,751 | 6/1970 | Oberster et al. | 260—533 L |

FOREIGN PATENTS

| 1,505,363 | 11/1967 | France | 260—586 B |

OTHER REFERENCES

Hawkins: Organic Peroxides, Spon Ltd., pp. 16 and 89.
March: Advanced Organic Chemistry, McGraw-Hill (1968), p. 901.

LORRAINE A. WEINBERGER, Primary Examiner
R. D. KELLY, Assistant Examiner

U.S. Cl. X.R.
260—535 R

UNITED STATES PATENT OFFICE
CERTIFICATE OF CORRECTION

Patent No. 3,772,375      Dated November 13, 1973

Inventor(s) JEAN-CLAUDE BRUNIE et al

It is certified that error appears in the above-identified patent and that said Letters Patent are hereby corrected as shown below:

Claims priority, application France, Oct. 11, 1968,
169,139 (should be --169,637--)

Signed and sealed this 23rd day of April 1974.

(SEAL)
Attest:

EDWARD M. FLETCHER, JR.
Attesting Officer

C. MARSHALL DANN
Commissioner of Patents